(12) United States Patent
Naegeli et al.

(10) Patent No.: US 6,574,797 B1
(45) Date of Patent: Jun. 3, 2003

(54) METHOD AND APPARATUS FOR LOCATING A CLEANER BANDWIDTH IN A FREQUENCY CHANNEL FOR DATA TRANSMISSION

(75) Inventors: Charles J. Naegeli, Montara, CA (US); Hung-San Chen, San Jose, CA (US); Alejandro H. Schwartzman, San Jose, CA (US); Xiong Yang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/227,991

(22) Filed: Jan. 8, 1999

(51) Int. Cl.$^7$ .................. H04N 7/173; H04N 11/00; H04B 3/46; H04B 1/10; H04J 3/16

(52) U.S. Cl. .................. 725/120; 725/111; 725/124; 725/125; 725/126; 348/192; 348/193; 375/224; 375/227; 370/437; 455/62; 455/63

(58) Field of Search .................. 725/120, 124, 725/125, 126, 111; 348/192, 193; 375/224, 227, 260; 370/252, 437, 447, 462, 463, 480, 465, 468, 485; 455/62, 63, 69, 3.05

(56) References Cited

U.S. PATENT DOCUMENTS

| | | | |
|---|---|---|---|
| 3,750,022 A | * | 7/1973 | Curry et al. .................. 327/99 |
| 4,145,656 A | * | 3/1979 | Merryman et al. ........ 340/7.42 |
| 4,665,494 A | | 5/1987 | Tanaka et al. |
| 5,048,054 A | * | 9/1991 | Eyuboglu et al. ........... 375/222 |
| 5,225,902 A | | 7/1993 | McMullan, Jr. |
| 5,297,186 A | * | 3/1994 | Dong ......................... 375/222 |
| 5,488,412 A | | 1/1996 | Majeti et al. |
| 5,586,121 A | | 12/1996 | Moura et al. |
| 5,631,846 A | | 5/1997 | Szurkowski |
| 5,729,824 A | | 3/1998 | O'Neil et al. |
| RE35,774 E | | 4/1998 | Moura et al. |

(List continued on next page.)

OTHER PUBLICATIONS

Ulm, et al., "Data–Over–Cable Service Interface Specification", *Radio Frequency Interface Specification*, No. *102–971008*, (1997).

ANSI®, Carrier–to–Customer Installations–DS1 Metallic Interface, *American National Standard for Telecommunications*, T1.403 (1989).

Rogers Engineering, Two–Way CATV Plant Characterization Test Procedures, *Test Procedures for Two–Way CATV Plant Characterization*, p. 8 (1993).

R.P.C. Wolters, "Characteristics of Upstream Channel Noise in CATV–Networks", *IEEE Transactions of Broadcasting*, vol. 42, No. 4, pp. 328–332 (1996).

(List continued on next page.)

*Primary Examiner*—John Miller
*Assistant Examiner*—N Rouvas
(74) *Attorney, Agent, or Firm*—Beyer Weaver & Thomas, LLP

(57) ABSTRACT

Apparatus, methods, and computer program products for utilizing a frequency channel determined to be unacceptably noisy by finding a cleaner, narrower bandwidth within the frequency channel. Initially data is received on a frequency channel at a CMTS, specifically an upstream receiver, and by a narrow bandwidth detector, connected to a processor also used by components in the CMTS. The narrow bandwidth detector performs a Fast Fourier Transform (FFT) on the frequency channel thereby creating multiple FFT points within the frequency channel. A clean bandwidth for transmitting data within the frequency channel is identified where the clean bandwidth is derived from a subset of FFT points from the full set of FFT points. The subset of FFT points are contiguous points that have a noise level below a predetermined noise threshold.

44 Claims, 8 Drawing Sheets

U.S. PATENT DOCUMENTS

| | | | |
|---|---|---|---|
| 5,764,699 A | * | 6/1998 | Needham et al. ............ 375/261 |
| 5,790,523 A | | 8/1998 | Ritchie et al. |
| 5,802,446 A | * | 9/1998 | Giorgi et al. ................ 370/241 |
| 5,818,845 A | | 10/1998 | Moura et al. |
| 5,828,655 A | | 10/1998 | Moura et al. |
| 5,857,147 A | * | 1/1999 | Gardner et al. ............. 370/236 |
| 5,859,852 A | | 1/1999 | Moura et al. |
| 5,862,451 A | | 1/1999 | Grau et al. |
| 5,867,528 A | * | 2/1999 | Verbueken .................. 370/206 |
| 5,939,887 A | * | 8/1999 | Schmidt et al. ............. 324/613 |
| 5,943,604 A | | 8/1999 | Chen et al. |
| 5,946,048 A | | 8/1999 | Levan |
| 5,956,047 A | | 9/1999 | Levan |
| 5,956,346 A | | 9/1999 | Levan |
| 5,959,660 A | | 9/1999 | Levan |
| 5,959,997 A | | 9/1999 | Moura et al. |
| 6,032,019 A | * | 2/2000 | Chen et al. ................. 348/193 |
| 6,041,340 A | | 3/2000 | Mintzer |
| 6,094,211 A | | 7/2000 | Baran et al. |
| 6,281,829 B1 | | 8/2001 | Amrany et al. |
| 6,321,384 B1 | | 11/2001 | Eldering |
| 6,370,153 B1 | | 4/2002 | Eng |
| 6,385,773 B1 | * | 5/2002 | Schwartzman et al. ..... 725/124 |
| 6,389,068 B1 | * | 5/2002 | Smith et al. ................ 370/468 |

OTHER PUBLICATIONS

Naegeli et al., "Method and Apparatus for Using a Spectrum Analyzer for Locating Ingress Noise Gaps", Cisco Technology, U.S. Application No. 08/993,334, filed Dec. 19, 1997, pp. 1–44.

Wavetek®, "RP100 Return Path Monitoring System," *Product Brochure*, (1997).

Wei–Sing Chen, "Method and Apparatus for Selecting Optimum Frequency for Upstream Data Transmission in a Network System Utilizing Cable Modems" U.S. Patent Application No. 09/286,202, filed Apr. 5, 1999, 47 pages.

* cited by examiner

METHOD AND APPARATUS FOR LOCATING A CLEANER BANDWIDTH IN A FREQUENCY CHANNEL FOR DATA TRANSMISSION

CROSS-REFERENCES TO RELATED APPLICATIONS

This application is related to U.S. patent application Ser. No. 08/962,231, filed on Oct. 31, 1997, entitled "Echo Device Method for Locating Upstream Ingress Noise Gaps at Cable Television Headends," and U.S. patent application Ser. No. 09/227, 060, filed concurrently herewith, entitled "Method and Apparatus for Upstream Frequency Channel Transition, which are incorporated herein by reference.

BACKGROUND OF THE INVENTION

1. Field of the Invention

The present invention relates generally to the field.of data transmission using cable modems in a cable television plant. More specifically, the invention relates to transmitting data upstream to a headend by locating cleaner and more reliable data carriers.

2. Discussion of Related Art

The cable TV industry has been upgrading its signal distribution and transmission infrastructure since the late 1980s. In many cable television markets, the infrastructure and topology of cable TV systems now include fiber optics as part of its signal transmission component. This has accelerated the pace at which the cable industry has taken advantage of the inherent two-way communication capability of cable systems. The cable industry is now poised to develop reliable and efficient two-way transmission of digital data over its cable lines at speeds orders of magnitude faster than those available through telephone lines, thereby allowing its subscribers to access digital data for uses ranging from Internet access to cable commuting.

Originally, cable TV lines were exclusively coaxial cable. The system included a cable headend, i.e. a distribution hub, which received analog signals for broadcast from various sources such as satellites, broadcast transmissions, or local TV studios. Coaxial cable from the headend was connected to multiple distribution nodes, each of which could supply many houses or subscribers. From the distribution nodes, trunk lines (linear sections of coaxial cable) extended toward remote sites on the cable network. A typical trunk line is about 10 kilometers long. Branching off of these trunk lines were distribution or feeder cables (40% of the system's cable footage) to specific neighborhoods, and drop cables (45% of the system's cable footage) to homes receiving cable television. Amplifiers are provided to maintain signal strength at various locations along the trunk line. For example, broadband amplifiers are required about every 2000 feet depending on the bandwidth of the system. The maximum number of amplifiers that can be placed in a run or cascade is limited by the build-up of noise and distortion. This configuration, known as tree and branch, is still present in older segments of the cable TV market.

With cable television, a TV analog signal received at the headend of a particular cable system is broadcast to all subscribers on that cable system. The subscriber simply needed a television with an appropriate cable receptor to receive the cable television signal. The cable TV signal was broadcast at a radio frequency range of about 50 to 860 MHz. Broadcast signals were sent downstream; that is, from the headend of the cable system across the distribution nodes, over the trunk line, to feeder lines that led to the subscriber's home or premises. However, the cable system did not have installed the equipment necessary for sending signals from subscribers to the headend, known as return or upstream signal transmission. Not surprisingly, nor were there provisions for digital signal transmission either downstream or upstream.

In the 1980s, cable companies began installing optical fibers between the headend of the cable system and distribution nodes (discussed in greater detail in FIG. 1 below). The optical fibers reduced noise, improved speed and bandwidth, and reduced the need for amplification of signals along the cable lines. At many locations, cable companies installed optical fibers for both downstream and upstream signals. The resulting system is known as a hybrid fiber-coaxial (HFC) system. Upstream signal transmission was made possible through the use of duplex or two-way filters. These filters allow signals of certain frequencies to go in one direction and signals having different frequencies to go in the opposite direction. This new upstream data transmission capability allowed cable companies to use set-top cable boxes and allowed subscribers pay-per-view functionality, i.e. a service allowing subscribers to send a signal upstream through the cable system to the headend indicating that they want to see a certain program.

In addition, cable companies began installing fiber optic lines into the trunk lines of the cable system in the late 1980s. A typical fiber optic trunk line can be up to 80 kilometers long, whereas a typical coaxial trunk line is about 10 kilometers long. Prior to the 1990s, cable television systems were not intended to be general-purpose communication mechanisms. Their primary purpose was transmitting a variety of television signals to subscribers. Thus, there had to be one-way transmission paths from a central location, known as the headend, to each subscriber's home, delivering essentially the same signals to each subscriber. HFC systems run fiber deep into the cable TV network offering subscribers more neighborhood specific programming by segmenting an existing system into individual serving areas having between 100 to 2,000 subscribers. Although networks using exclusively fiber optics would be optimal, present cable networks equipped with HFC configurations are capable of delivering a variety of high bandwidth, interactive services to homes for significantly lower costs than networks using exclusively fiber optic cables.

FIG. 1 is a block diagram of a two-way HFC cable system utilizing a cable modem for data transmission. It shows a headend 102 (essentially a distribution hub) which can typically service about 40,000 subscribers. Headend 102 contains a cable modem termination system (CMTS) 104 needed when transmitting and receiving data using cable modems. Headend 102 is connected through pairs of fiber optic lines 106 (one line for each direction) to a series of fiber nodes 108.

Each headend can typically support up to 80 fiber nodes. Pre-HFC cable systems used coaxial cables and conventional distribution nodes. Since a single coaxial cable was capable of transmitting data in both directions, one coaxial cable ran between the headend and each distribution node. In addition, because cable modems were not used, the headend of pre-HFC cable systems did not contain a CMTS. Each of the fiber nodes 108 is connected by a coaxial cable 110 to duplex filters 112 which permit certain frequencies to go in one direction and other frequencies to pass in the opposite direction (frequency ranges for upstream and downstream paths are discussed below). Each fiber node 108 can normally service about 500 subscribers, depending on the bandwidth. Fiber node 108, coaxial cable 110, two-way amplifiers 112, plus distribution amplifiers 114 along trunk line 116, and subscriber taps 118, i.e. branch lines, make up the coaxial distribution system of an HFC system. Subscriber tap 118 is connected to a cable modem 120. Cable modem 120 is, in turn, connected to a subscriber computer 122 or other appropriate device.

As briefly mentioned above, recently it has been contemplated that HFC cable systems can be used for two-way transmission of digital data. The data can be Internet data, digital audio data, or digital video data, in MPEG format, for example, from one or more external sources 100. Using two-way HFC cable systems for transmitting digital data is attractive for a number of reasons. Most notably, they provide up to a thousand times faster transmission of digital data than is currently possible over telephone lines. However, in order for a two-way cable system to provide digital communications, subscribers must be equipped with cable modems, such as cable modem 120. With respect to Internet data, the public telephone network has been used, for the most part, to access the Internet from remote locations. Through telephone lines, data is typically transmitted at speeds ranging from 2,400 to 56,600 bits per second (bps) using commercial (and widely used) data modems for personal computers. Using a two-way HFC system as shown in FIG. 1 with cable modems, data can be transmitted at speeds of 10 million bps, or more. Table 1 is a comparison of transmission times for transmitting a 500 kilobyte image over the Internet.

TABLE 1

| Time to Transmit a Single 500 Kbyte Image | |
|---|---|
| Telephone Modem (28.8 kbps) | 6–8 minutes |
| ISDN Line (64 kbps) | 1–1.5 minutes |
| Cable Modem (10 Mbps) | 1 second or less |

Furthermore, subscribers can be fully connected twenty-four hours a day to services without interfering with cable television service or phone service. The cable modem, an improvement of a conventional data modem, provides this high speed connectivity and, therefore, is instrumental in transforming the cable TV system into a full service provider of video, voice and data telecommunications services.

As mentioned above, the cable TV industry has been upgrading its coaxial cable systems to HFC systems utilizing fiber optics to connect headends to fiber nodes and, in some instances, using them in the trunk lines of the coaxial distribution system. In way of background, optical fiber is constructed from thin strands of glass that carry signals longer distances and have a wider bandwidth than either coaxial cable or the twisted pair copper wire used by telephone companies. Fiber optic lines allow signals to be carried much greater distances without the use of amplifiers (item 114 of FIG. 1). Amplifiers degrade the signal quality and can be expensive to maintain. Thus, coaxial distribution systems that use fiber optics have much less need for amplifiers. In addition, amplifiers are typically not needed for fiber optic lines (item 106 of FIG. 1) connecting the headend to the fiber nodes.

In cable systems, digital data is carried over radio frequency (RF) carrier signals. Cable modems are devices that convert a modulated RF signal to digital data (demodulation) and converts the digital data back to a modulated RF signal (modulation). The conversion is done at two points: the subscriber's home by a cable modem and at a CMTS located at the headend.

The CMTS converts the digital data to a modulated RF signal which is carried over the fiber and coaxial lines to the subscriber premises. The cable modem then demodulates the RF signal and feeds the digital data to a computer. On the return path, the operations are reversed. The digital data is input from a computer to the cable modem which converts it to a modulated RF signal. Once the CMTS receives the RF signal, it demodulates it and transmits the digital data to an external source.

As mentioned above, cable modem technology is in a unique position to meet the demands of users seeking fast access to information services, the Internet and business applications, and can be used by those interested in cable commuting. Not surprisingly, with the growing interest in receiving data over cable network systems, there has been a sharper focus on performance, reliability, and improved maintenance of such systems. Consequently, cable companies are in the midst of a transition from their traditional core business of entertainment television programming to being full service providers of video, voice and data telecommunication services. Among the elements that have made this transition possible are technologies such as the cable modem.

A problem common to all upstream data transmission on cable systems, i.e. transmissions from the cable modem in the home back to the headend, is ingress noise which lowers the signal-to-noise ratio of an upstream frequency channel. Ingress noise can result from numerous internal and external sources. Sources of noise internal to the cable system may include cable television network equipment, subscriber terminals (televisions, VCRs, cable modems, etc.), intermodular signals resulting from corroded cable termini, and core connections. Significant sources of noise external to the cable system include home appliances, welding machines, automobile ignition systems, and radio broadcasts, e.g. citizen band and ham radio transmissions. All of these ingress noise sources enter the cable system over the coaxial cable line, which acts essentially as a long antenna. Ultimately, when cable systems are entirely optical fiber, ingress noise will be a far less significant problem. However, until that time, ingress noise is and will continue to be a problem with upstream transmissions.

The portion of bandwidth reserved for upstream signals is normally in the 5 to 42 MHz frequency range in the United States, and 5 to 65 MHz in Europe. Portions of this upstream band may be allocated for set-top cable boxes, pay-per-view, voice data, and other services provided over the cable system. Thus, cable modems may only be entitled to some fraction of the entire upstream channel. A cable modem session may be allotted a "sub-band" typically between 200 KHz to 3.2 MHz wide within the fraction. This sub-band is referred to as a cable modem's "allotted band slice" of the entire upstream frequency range (5 to 42 MHz, or 5 to 65 MHz). However, problems arise because this portion of the spectrum—from 5 to 42 MHz in the United States—is particularly subject to ingress noise and other types of interference. Thus, cable systems offering two-way data services must be designed to operate given frequent ingress noise interference which effects data transmission reliability and accuracy.

As noted above, ingress noise, typically narrow band, e.g., below 100 KHz, is a general noise pattern found in cable systems. Upstream channel noise resulting from ingress noise adversely impacts upstream data transmission by reducing data throughput and interrupting service thereby adversely affecting performance and efficient maintenance.

When a particular group of contiguous sub-bands or allotted band slices, referred to as an "upstream frequency channel" or "frequency channel," reaches an unacceptable signal to noise ratio, the CMTS begins searching for a cleaner, unused frequency channel for the upstream signal. In other words, when a frequency channel gets too noisy, the CMTS will automatically locate an alternative frequency channel. A frequency channel is used by a group of cable modems (the grouping typically based on physical location) to transmit signals upstream to the headend.

However, changing frequency channels for a group of modems requires significant overhead in terms of processing at the headend by the CMTS and cable plant signal traffic. Cable modems in the cable plant can be divided into groups (or subscriber areas) in which cable modems in each group share the same upstream frequency channel. This is possible by using, for example, time division multiplexing, a technique known in the art. In addition, the other frequency may not result in an improved signal to noise ratio if there is general ingress noise effecting the entire upstream band in the cable plant. If there is a major source of noise in the external or internal environments to the cable plant spanning a wide frequency spectrum, the headend can continually switch upstream frequency channels and still not result in any significant improvement in signal to noise ratio. In this situation and in other less extreme situations it may be better to continue using the current frequency channel even; its noise level is above a certain threshold level. In this case, transitioning to another frequency channel would be undesirable. The overhead in traffic on the cable plant resulting from the CMTS having to inform each cable modem to change frequencies can be high, typically requiring up to ten minutes. It is preferable to minimize using the fiber and coaxial lines for signaling frequency changes and indicating telemetry status of the cable modems. It would be preferable to continue using the same frequency channel so that the CMTS would not have to send out initial maintenance messages to all the cable modems and not have to receive ranging request messages from those cable modems in order to allot new timing marks to the cable modems. This process is better avoided if possible, especially if there is no guarantee that an alternative frequency channel would result in a better signal to noise ratio.

Therefore, it would be desirable to be able to detect or identify a sub-bandwidth within a currently used upstream frequency channel that has an acceptable noise level and can be used to transmit signals upstream. It would be desirable to identify this sub-bandwidth in the frequency channel while the frequency channel is in use. If transitioning to another frequency channel, would be desirable to know of this sub-bandwidth before transitioning. It would also be desirable to take into account certain modulation schemes when detecting the sub-bandwidth, such as QPSK and QAM16, as instructed by the DOCSIS standard for cable modems.

SUMMARY OF THE INVENTION

According to the present invention, methods, apparatus, and computer program products are disclosed for identifying and utilizing a cleaner, usable bandwidth within a noisy frequency channel for transmitting data upstream in a cable plant. In one aspect of the invention, a method of utilizing a frequency channel, determined to have an unacceptably high noise level, for transmitting data upstream in a cable plant from cable modems to a cable modem termination system (CMTS) is described. Data is received on a frequency channel of interest at a CMTS. An analysis is performed on the frequency channel of interest thereby creating multiple analysis points within the frequency channel. A clean bandwidth for transmitting data within the frequency channel is identified where the clean bandwidth is derived from a subset of analysis points from the full set of analysis points created from performing the analysis. Cable modems in the cable plant are then instructed to use the clean bandwidth to transmit data.

In one embodiment, data is received at a CMTS on a particular frequency channel, digitized, and routed to a narrow bandwidth detector. In another embodiment, a field programmable gate array ("FPGA") is configured to perform the analysis on the particular frequency channel. In another embodiment, identifying a clean bandwidth involves comparing the noise level of an analysis point to a threshold noise level and incrementing a counter corresponding to the number of analysis points in the channel having noise levels below the threshold. In yet another embodiment, the value of the counter is saved and reset if the noise level of the analysis point is above the threshold noise level. In yet another embodiment, the largest, saved, counter value is determined and the clean bandwidth is derived by taking the product of the largest counter value and the width of an analysis point. The symbol rate of an upstream receiver may be adjusted to accept data at the new cleaner bandwidth. In yet another embodiment, the set of analysis points includes contiguous analysis points where each contiguous analysis point has a noise level that meets a predetermined criteria, such as having a noise level lower than a threshold noise level. In yet another embodiment, the analysis performed is a Fast Fourier Transform and the analysis points are FFT points or bins.

In another aspect of the present invention, a method of identifying a usable, acceptably clean bandwidth in a frequency channel determined to have an unacceptably high noise level, where the clean bandwidth is capable of transmitting data using either one of two modulation schemes. An FFT is performed on the noisy frequency channel thereby creating a set of FFT points and noise level measurements for each one of the FFT points. As this is performed, each of the noise level measurements are saved or stored for subsequent processing. Each of the noise level measurements is compared to a noise threshold associated with a particular modulation scheme. One counter corresponding to the modulation scheme as well as another counter corresponding to another particular modulation scheme is incremented if the noise level measurement is less than the noise threshold. The same noise level measurement is compared to another noise threshold and the second counter associated with the other particular modulation scheme is incremented if the noise level measurement is less than the other, second noise threshold. These comparison steps are repeated until each noise level measurement for each of the FFT points has been compared to the noise thresholds. The two counters are compared to each other to determine which particular modulation scheme will be used. A usable, clean bandwidth is derived based on either one of the two counters and the width of an FFT point.

In one embodiment, comparing the noise level measurement to the noise thresholds involves saving the counter values and resetting the counters to an initial value, such as zero, if the noise level measurement is greater than the noise thresholds. In another embodiment, one of the noise thresholds is based on the QAM16 modulation scheme and another noise threshold is based on the QPSK modulation scheme. In yet another embodiment, the largest value of each of the counters is determined and compared using multiples of one or the other, such as comparing the counter associated with the QPSK modulation scheme with twice the value of the largest counter value associated with the QAM16 modulation scheme. In yet another embodiment, the usable bandwidth is derived by taking the product of the width of an FFT point and the largest value of one of the two counters.

In another aspect of the present invention, a system for detecting a usable bandwidth within a noisy frequency channel is described. The system includes a processor and a narrow bandwidth detector having a memory, a processor interface, and a data processor configured to perform an FFT. The FFT is performed on a signal carried on a frequency channel resulting in a set of FFT points. A subset of contiguous FFT points from the set of FFT points is identified as being a clean usable bandwidth for transmitting data.

In one embodiment, the system includes a filter, such as a digital receiver, for narrowing a broader upstream channel to the frequency channel as input to the narrow bandwidth detector. In another embodiment, the system includes an analog/digital converter for digitizing an analog signal. In yet another embodiment, the system includes an upstream receiver having an adjustable input symbol rate which can be adjusted based on the width of the frequency channel. In yet another embodiment, the narrow bandwidth detector is located outside the headend of a cable plant. In yet another embodiment, the narrow bandwidth detector is located within the headend of a cable plant. In yet another embodiment, the processor is in communication with components of the CMTS and the processor interface of the narrow bandwidth detector in an interface to the processor thereby allowing the processor to communicate with the narrow bandwidth detector and for the narrow bandwidth detector to communicate with components in the CMTS.

In another aspect of the invention, a computer program product for utilizing a frequency channel for transmitting data upstream in a cable plant from cable modems to a CMTS is described. The computer program product includes computer code or programming instructions that receives data at a CMTS on a particular frequency channel. Another portion of computer code performs an FFT on the particular frequency channel thereby creating multiple FFT points within the particular frequency channel. Another portion of computer code identifies a clean bandwidth for transmitting data within the particular frequency channel wherein the clean bandwidth is derived from a subset of FFT points from the multiple FFT points. Another portion of computer code instructs cable modems in the cable plant to use the clean bandwidth to transmit data. The computer program product includes a computer-readable medium that stores the computer codes.

BRIEF DESCRIPTION OF THE DRAWINGS

The invention will be better understood by reference to the following description taken in conjunction with the accompanying drawings in which.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

Figure 1:
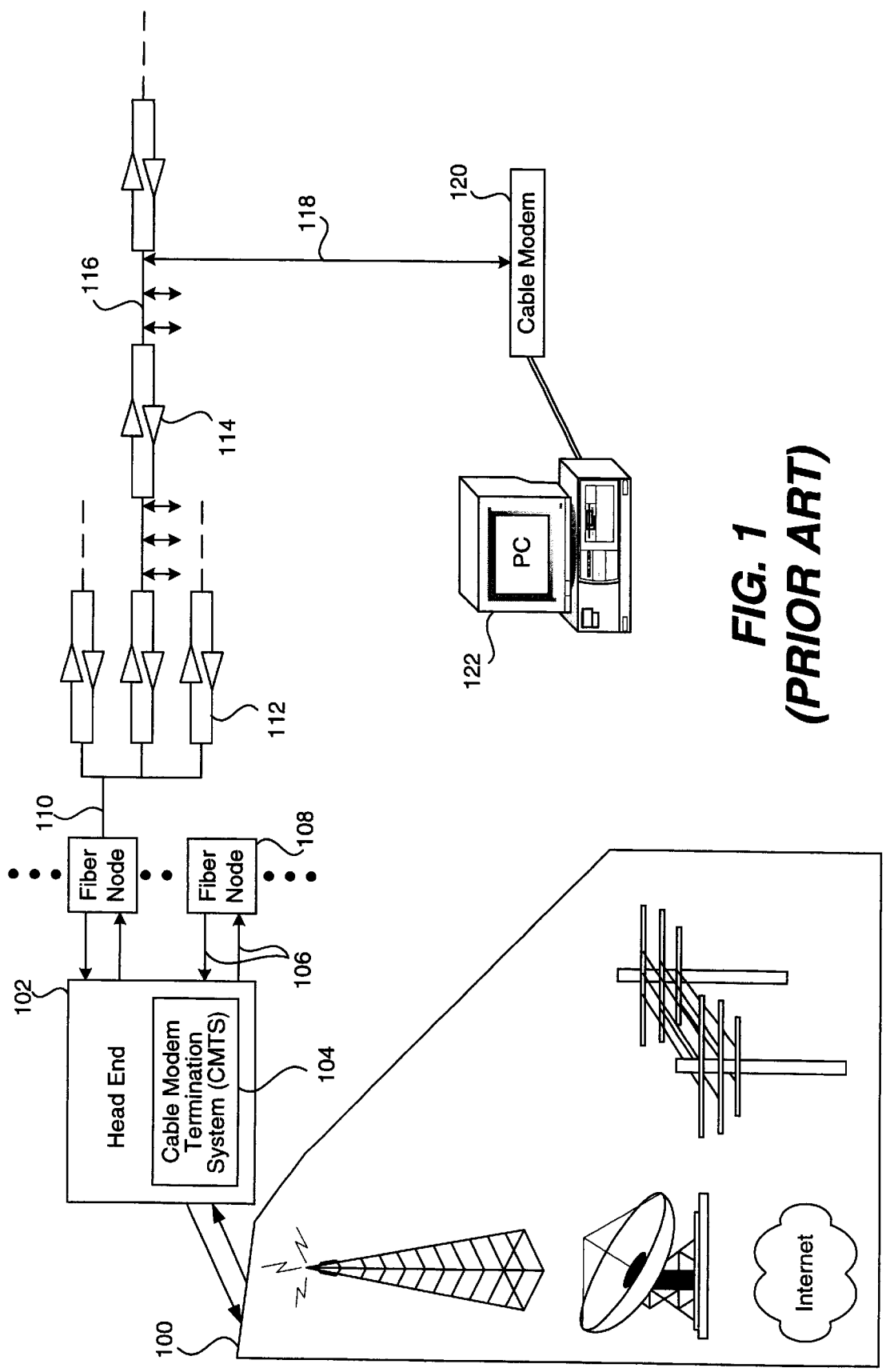
FIG. 1 is a block diagram of a two-way HFC cable system utilizing a cable modem for data transmission.

In accordance with one embodiment of the present invention, there is provided apparatus and methods for utilizing a narrower and acceptably clean bandwidth within an otherwise unacceptably noisy upstream frequency channel as described in the various figures. An upstream receiver, located in the CMTS as shown in FIG. 1, is capable of receiving data at various symbol rates. However, to be cost effective, the upstream receiver and related hardware components are designed or configured to receive data at the maximum bandwidth at the maximum symbol rate. The present invention relies in part on the fact that the symbol or data rate of the upstream data can be varied to fit the available bandwidth. The symbol rate is the rate at which data (also referred to as symbols) can be transmitted on a channel. This symbol rate is directly proportional to the amount of bandwidth available. Given that the symbol rate can be adjusted on the upstream channel, it would be beneficial to be able to detect a cleaner although narrower bandwidth or "sub-frequency channel" within a current frequency channel that has reached an unacceptable noise level. This narrower bandwidth can be identified by locating a group of contiguous band slices or "bins" created from performing an FFT on the current frequency channel. Once a group of contiguous band slices has been identified, the symbol rate is adjusted downwards to fit the new bandwidth and this adjusted symbol rate becomes the new maximum symbol rate. In another preferred embodiment, an alternative frequency channel can be identified having a lower, but still unacceptably high, noise level than the current frequency channel. Before transitioning to the alternative frequency channel, a group of contiguous band slices within the alternative frequency channel can be identified and a maximum symbol rate can be determined. Using this information, the CMTS can decide whether to transition to the alternative frequency channel. Before discussing in detail a process of identifying a desirable group of contiguous band slices, FIGS. 2 and 3 illustrate the location and internal components of a narrow bandwidth detector and CPU of the present invention.

Figure 2:
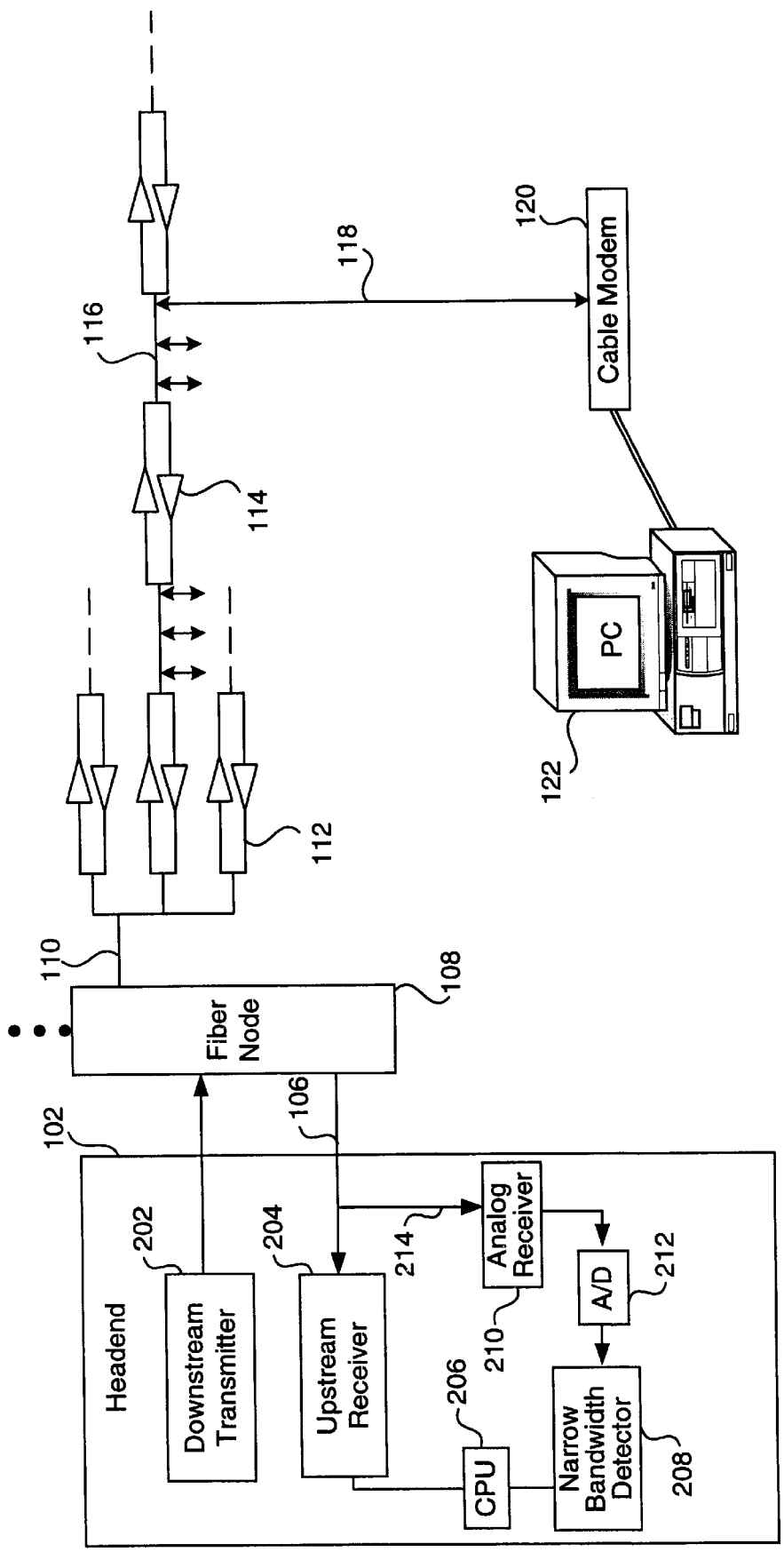
FIG. 2 is a block diagram depicting a location of a narrow bandwidth detector and related components in the cable plant in accordance with one embodiment of the present invention.

FIG. 2 is a block diagram depicting a location of a narrow bandwidth detector and related components in the cable plant in accordance with one embodiment of the present invention. Many of the components shown in the cable plant are unchanged and were initially described in FIG. 1, such as fiber node 108, filters 112, and cable modem 120. Some of the components of headend 102, and specifically CMTS 104, are shown in greater detail. A downstream transmitter 202 prepares data from sources 100 and sends the data downstream in the cable plant to the cable modems. The components and operation of downstream transmitter and related components, such as a media access control (MAC) unit (not shown), are described in greater detail in U.S. application Ser. No. 08/962,231 entitled "Echo Device Method for Locating Upstream Ingress Noise Gaps at Cable Television Headends" incorporated by reference herein. Also shown is an upstream receiver 204, also contained in the CMTS, that receives upstream signal 106 at a particular symbol or data rate (typically the maximum possible data rate). Upstream receiver 204 is connected to a CPU 206 that does much of the processing (e.g., comparing noise data values) needed in the CMTS. Upstream receiver 204 is also described in greater detail in U.S. application Ser. No. 08/962,231. As discussed in greater detail below, upstream receiver 204 can adjust its symbol rate so that it can receive data, transmitted at varying bandwidths, at various rates.

In the described embodiment, a narrow bandwidth detector 208 is located within headend 102. In other preferred embodiments, detector 208, as well as an analog receiver 210 and analog/digital converter 212 can operate outside headend 102. In another preferred embodiment, analog/digital converter 212 can receive the signal first and then transmit the signal to a digital receiver. What is required is that narrow bandwidth detector 208 receive the upstream signal (at some fraction of the signal's total power), shown at line 214 and that signal 106 still be transmitted to upstream receiver 204 in the CMTS. Radio frequency signals enter headend 102 and are routed to bandwidth detector 208 and to upstream receiver 204. Receiver 210 filters the signal so that only a frequency channel of interest is routed to A/D converter 212 and bandwidth detector 208. The role of receiver 210 is described in greater detail below in FIGS. 4 and 5. Narrow bandwidth detector 208 also operates in conjunction with CPU 206 and is able to communicate with upstream receiver 204 and other components of the CMTS through CPU 206. As mentioned above, bandwidth detector 208, receiver 210, and A/D converter 212, can all be located outside headend 102 and still perform their respective functions. Bandwidth detector 208 can communicate with CMTS components, including upstream receiver 204 and the MAC unit, for example, using CPU 206 or a CPU external to the CMTS that operates in conjunction with some or all components in the CMTS. Bandwidth detector 208 should have access to upstream signal 106 and thus can be located between headend 102 and fiber node 108.

Figure 3:
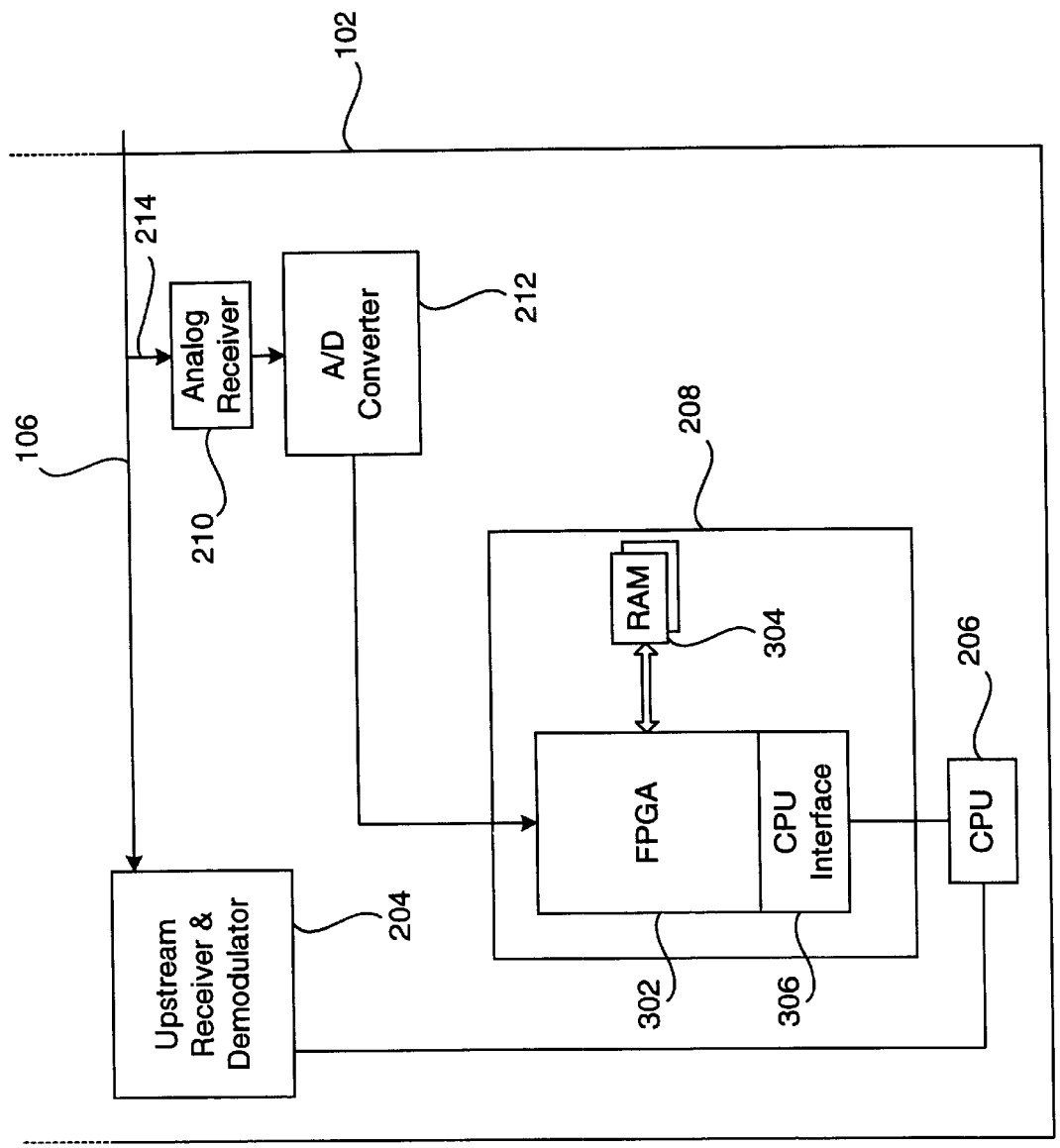
FIG. 3 is a block diagram illustrating in greater detail components of a narrow bandwidth detector in accordance with one embodiment of the present invention.

FIG. 3 is a block diagram illustrating in greater detail components of a narrow bandwidth detector in accordance with one embodiment of the present invention. Once upstream signal 214 is filtered by receiver 210 and digitized by A/D converter 212, the first component in narrow bandwidth detector 208 to receive the data is a field programmable gate array (FPGA) 302 or other configured or configurable data processing device, such as an ASIC or other type of digital signal processor, where the data is processed.

In the described embodiment, FPGA 302 is configured to perform all the mathematical operations required for a Fast Fourier Transform (FFT). In other embodiments, alternative components, such as a digital signal processor, can be used to perform the FFT. As described in greater detail below, FFT divides the frequency channel of interest (i.e., the frequency channel that passes through analog receiver 210) into bins or FFT points. Coupled to FPGA 302 is a memory storage area in the form of random access memory units 304 used to store data necessary for performing the mathematical functions of the FFT implemented in FPGA 302. RAM 304 is also used to temporarily store noise or power level data of the frequency channels. Noise level data is used in various ways, one of which (described in greater detail below) is in a comparison to threshold noise levels set according to QAM16 and QPSK modulation schemes in the described embodiment. In other preferred embodiments, thresholds based on other modulation schemes can be implemented. This comparison, performed by the CPU, is described in greater detail below.

Once the data is processed by FPGA 302, the data can be accessed by CPU 206 through to a CPU interface 306 within FPGA 302. CPU interface 306 is a hardware component that enables CPU 206 to read data calculated from the FFT implemented on FPGA 302. FPGA 302 and CPU 206 perform several of the functions of the present invention and are described in the flow diagrams below. As mentioned above, FPGA 302 is configured to perform an FFT, a technique known in the art for measuring the power of a frequency channel as explained in "Digital Techniques for Wide Band Receivers" by James Tsui, published by Artech Llouse, 1995 (ISBN 0-89006-808-9), pages 104 to 108, incorporated by reference herein. By performing an FFT, FPGA 302 divides a frequency, whether a frequency channel or the entire upstream band, into multiple bandslices or bins typically having small bandwidths in the range of 50 to 80 KHz each.

CPU 206 has numerous functions in headend 102. With respect to the present invention, CPU 206 scans or examines the power level data calculated by the FFT. CPU 206 can be programmed to take into account buffers or threshold values in determining whether the noise or power level of a particular frequency channel meets predetermined conditions. For example, it can determine whether the noise level of an FFT point is less than a threshold noise level determined by a modulation scheme, or whether a bit error rate (BER) provided by an upstream receiver for certain data packets is greater than a threshold BER value. It should also be noted that, in the described embodiment, CPU 206 is a processor for headend 102 and can communicate instructions or data from one component to another component in headend 102 or to components external to the CMTS or headend 102. Thus, CPU 206 can be used to communicate instructions resulting from data derived from the FFT in narrow bandwidth detector 208 to downstream transmitter 202 or to a MAC unit, for example, instructing it to use a narrower bandwidth for a group of cable modems. In other preferred embodiments, multiple CPUs can be utilized to perform the necessary processing functions of the CMTS.

Figure 4:
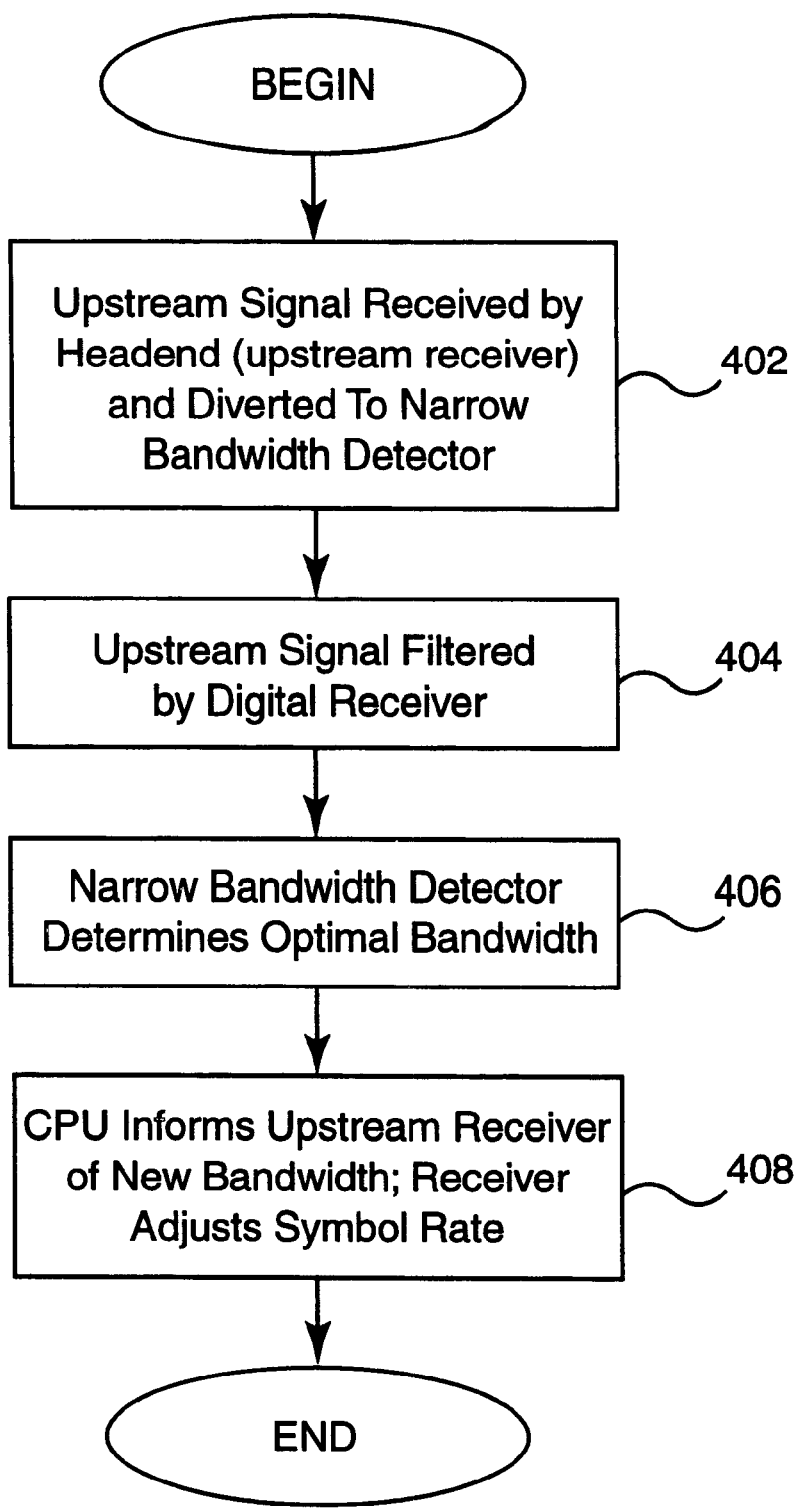
FIG. 4 is a high-level flow diagram of a process for identifying a usable group of contiguous band slices in accordance with one embodiment of the present invention.

To further illustrate the foregoing, FIG. 4 is a high-level flow diagram of a process for identifying a usable group of contiguous band slices in accordance with one embodiment of the present invention. At a step 402 an upstream signal is received at a CMTS in the headend of a cable plant. The upstream signal is received by an upstream receiver, typically in the CMTS, and by a bandwidth detector as described above. An upstream signal is transmitted in a particular frequency channel (typically having a bandwidth of 200 KHz to 3.2 MHz) which is located in an assigned portion (typically 5 to 10 MHz wide) within the entire upstream channel (i.e., 5 to 42 MHz). The upstream channel is divided into portions or segments that can be used for certain types of data transmission, such as telephony or video data (e.g. pay-per-view programming). One portion is reserved for digital data transmission used to transmit data on the Internet, for example. Thus, cable modems are allowed to use only their allotted portion of the upstream band (e.g., from 22 to 27 MHz or 31 to 39 MHz). As mentioned above, it is desirable to be able to continue using a current noisy frequency channel by determining the largest usable bandwidth within the frequency channel that has become generally unacceptably noisy.

The current frequency channel may have a bandwidth within it that can be used to transmit data with an acceptable degree of reliability although at a lower symbol rate. A same process can also be used on other frequency channels in the portion allotted for digital data transmission in the upstream band. By doing this, the CMTS can determine a maximum symbol rate of an alternative frequency channel. The CMTS can then use this information to decide whether to instruct a group of cable modems to use an alternative frequency channel. However, in the described embodiment the process is applied to the current frequency channel since it is desirable to find a narrower bandwidth on the same frequency channel even if it necessarily requires reducing the symbol rate. This is true in many cases because changing frequency channels takes time and requires significant processing overhead.

At a step 404 the upstream signal is routed to a receiver, such as a digital or analog receiver (different from the upstream receiver in the CMTS), that performs as a filter. Since only a portion of the upstream band is used to transmit digital data, only that portion is subsequently examined for contiguous clean bins or FFT points created from performing the FFT, as discussed in greater detail below. The receiver simply filters all frequencies outside the frequencies of interest. These values are typically set by the cable plant operator. In another preferred embodiment, another type of receiver or device such as an FIR filter can be used to filter those frequencies not of interest. The digital receiver digitizes the upstream signal by taking a number of samples of the signal, such as 1024 samples (i.e., $2^{10}$, or some other power of two). For a signal having a frequency range of 5–42 MHz, or 5 to 65 MHz in Europe, a typical digital receiver in the described embodiment would produce 100 KHz samples.

At step 406 a narrow bandwidth detector determines the optimal bandwidth within a particular frequency range using the samples produced by the digital receiver at step 404. As described above, in the described embodiment, the narrow bandwidth detector is an FPGA configured to perform an FFT operating in conjunction with a processor or CPU via a CPU interface component of the FPGA. The FFT "binarizes" the frequency range of interest and measures the noise level of each bin. The number of bins, also referred to in the art as FFT points, determines whether the computation can be run in real time. In the described embodiment, a 128-point FFT using 50 kHz samples can generally be run in close to real time. A process of determining an optimal clean bandwidth within a frequency range is described in greater detail in FIGS. 5 and 6 below.

At a step 408 the CPU operating in conjunction with the narrow bandwidth detector informs the upstream receiver of the new bandwidth. The upstream receiver uses the range of the new bandwidth to determine an appropriate symbol rate. This new symbol rate is lower than the original symbol rate since the newer, cleaner bandwidth is smaller than the original frequency range. As mentioned above, utilizing a cleaner bandwidth within a noisy frequency range is possible given that the upstream receiver is able to dynamically adjust its symbol rate to match the narrower bandwidth. Although the symbol rate is lower, the bandwidth used is cleaner. Having a clean bandwidth is important in the context of digital data transmission since consumers and subscribers are generally less tolerant of unreliable or faulty data transmission than they are of a somewhat slower data transmission rate.

Figure 5:
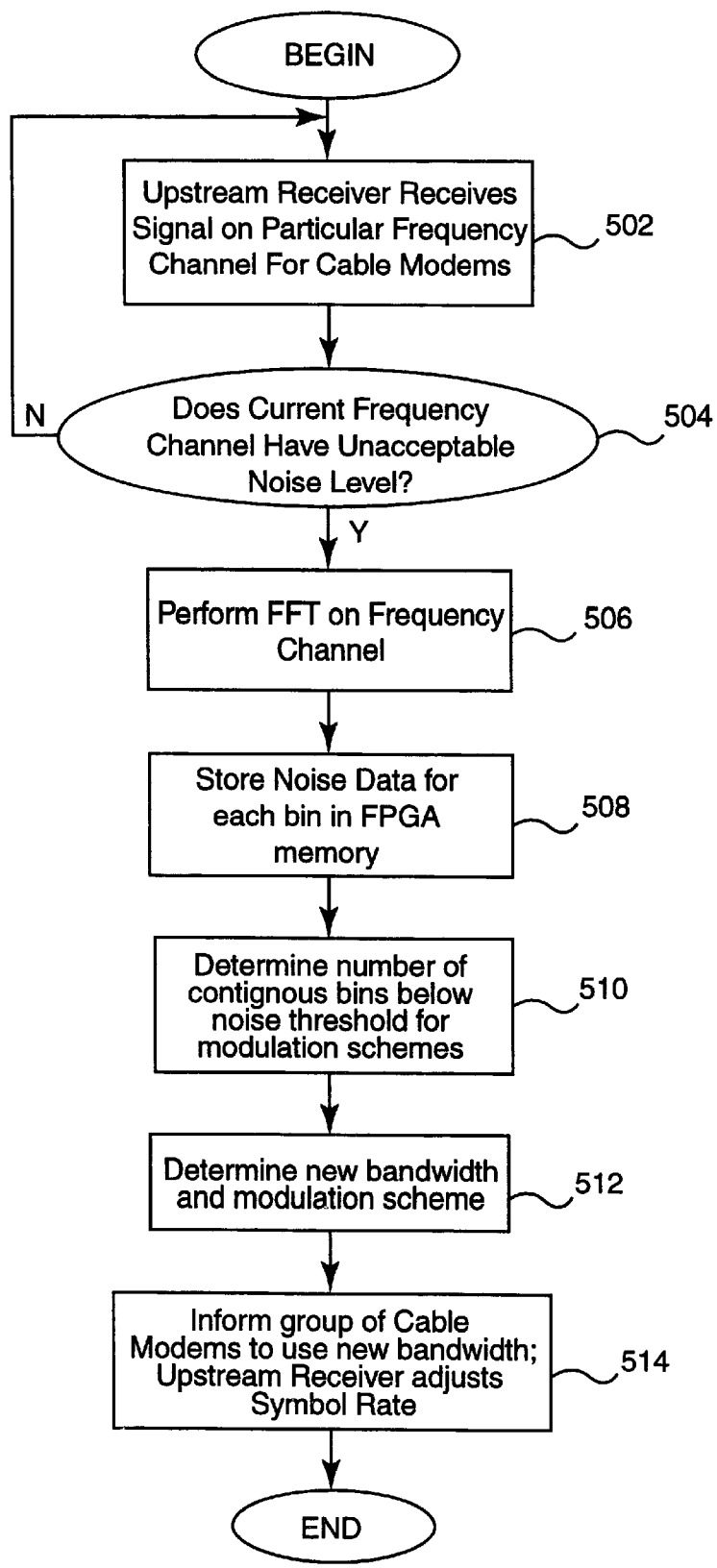
FIG. 5 is a flow diagram of a process for locating a clean bandwidth within a frequency channel in accordance with one embodiment of the present invention.

FIG. 5 is a flow diagram of a process for locating a clean bandwidth within a frequency channel in accordance with one embodiment of the present invention. As described above, a group of contiguous "bins" or FFT points is identified and used to transmit data upstream at an adjusted symbol rate. At a step 502 the upstream receiver receives a signal from a group of cable modems on a particular frequency channel. Generally, the upstream receiver must receive the signal in order for the CMTS to process it. The upstream receiver, operating in conjunction with a CPU, can determine whether the noise level for the particular frequency channel is too high by examining how much data was lost in the data packets received by looking at packet headers, a process known in the art. In another preferred embodiment, the noise level can be determined by measuring noise by performing an FFT on the frequency channel at times when empty data packets are received. This process is described in greater detail in U.S. Patent Application entitled "Method and Apparatus for Upstream Frequency Channel Transition" Application No. (not yet assigned), filed concurrently, and commonly assigned, incorporated by reference herein.

At a step 504 the upstream receiver and CPU determine whether the frequency channel has an unacceptable noise level. The noise level is set so that frequency channels change when the amount of data lost or altered during transmission becomes unacceptable and transmission becomes unreliable. If the current frequency channel has an acceptable noise level, control returns to step 502 where the upstream receiver continues receiving a signal on that frequency channel. If the noise level gets too high, control goes to a step 506 in which an FFT is performed on the current frequency channel. In another preferred embodiment an FFT can be performed on another potentially cleaner frequency channel. In the described embodiment, the FFT is performed on the currently used frequency channel thereby "binarizing" the channel and deriving FFT points. As discussed above, in the described embodiment, the FFT is performed by an FPGA component tapping into an upstream line heading to the upstream receiver. In other preferred embodiments, the FFT can be performed by an appropriate digital signal processor.

At a step 508 the power level data for each bin is stored in the FPGA memory. The power level data can be interpreted as noise level data if the signal received is expected to be clean but registers as having a high power level at certain points. High power level spikes, for example, indicate noise in an otherwise clean channel. This reading of the FFT is described in greater detail below in FIG. 7. At a step 510 the narrow bandwidth detector and CPU determine the number of contiguous bins that are below threshold noise levels for particular modulation schemes. What is produced at step 510 is one or more contiguous bin sets and the number of bins in each set. In the described embodiment, the modulation schemes are QPSK and QAM16, as is typically used for upstream signal modulation and are the two modulation schemes specified in the DOCSIS standard for cable modems. The CPU determines whether a particular power level of a bin is above or below a threshold and stores this data in the FPGA memory. The thresholds are determined according to the modulation scheme. For example, the noise threshold level for QPSK is approximately 15 dB carrier-to-noise ratio (CNR) and 23 dB CNR for QAM16. If a power level for a bin is higher than a noise threshold, that portion of the frequency channel should not be used to, transmit data upstream using the modulation scheme corresponding to the noise threshold. This process is described in greater detail in FIGS. 6 and 7.

At a step 512 the narrow bandwidth detector and CPU determine a new bandwidth and possibly new modulation scheme from the information gathered at step 510. Specifically, the new bandwidth is determined from the highest number of contiguous bins below the noise thresholds for each modulation scheme. Step 512 is also described in greater detail in FIGS. 6 and 7. At a step 514 the CPU informs a media access control unit (MAC unit) in the CMTS to send messages out to the original group of cable modems to use the new bandwidth. The MAC unit and other components of a CMTS are described in greater detail in U.S. patent application Ser. No. 08/962,231, filed on Oct. 31, 1997, entitled "Echo Device Method for Locating Upstream Ingress Noise Gaps at Cable Television Headends" and commonly assigned, which is incorporated by reference herein. The cable modems then center their new frequency channel at the center of the newly allotted bandwidth. The upstream receiver adjusts its symbol rate so that it can begin accepting data at the new rate to reflect the new upstream bandwidth at which point the process is complete.

Figure 6A:
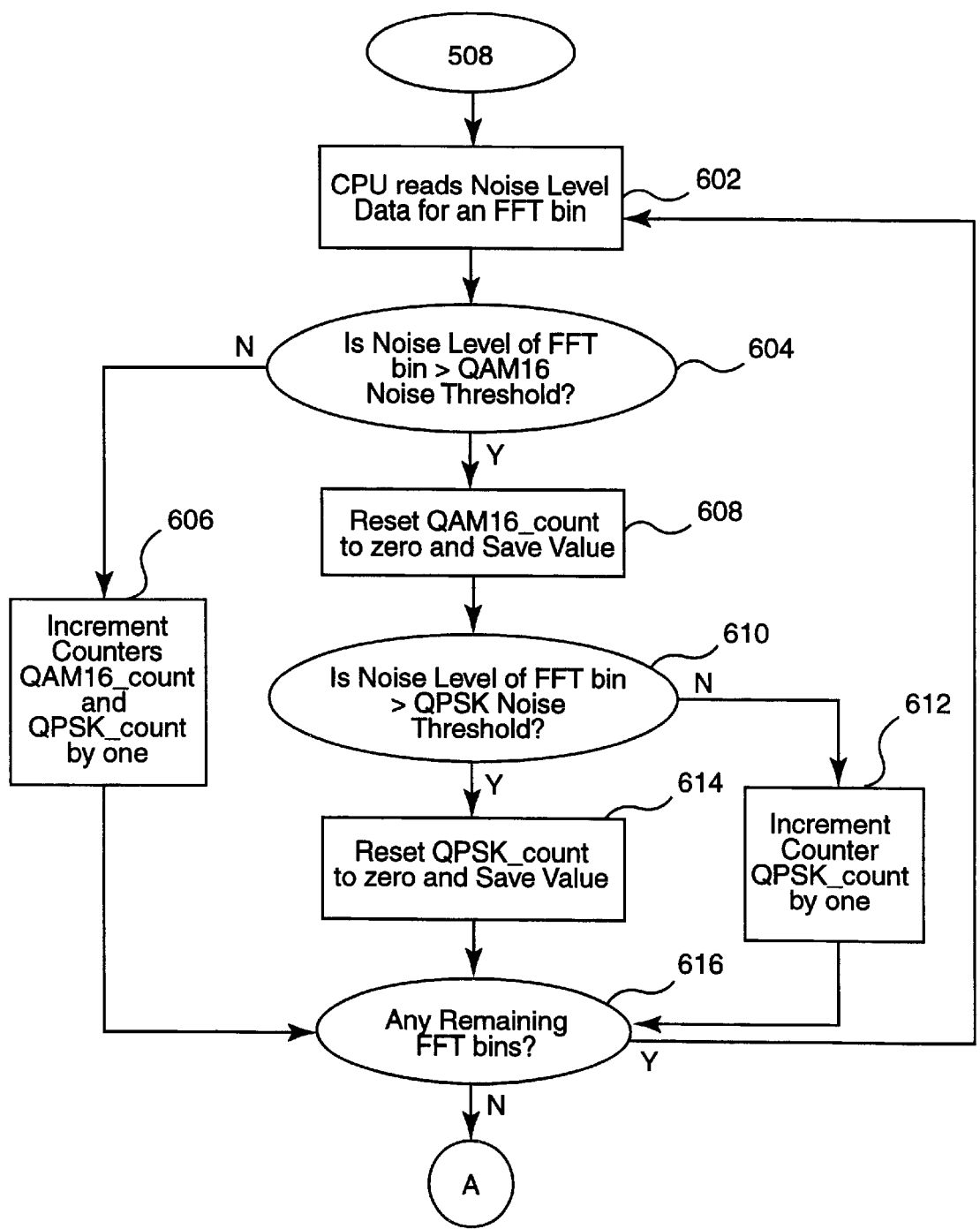
FIG. 6 is a flow diagram describing in greater detail steps 510 and 512 of FIG. 5 in which a new bandwidth is determined based on the number of contiguous clean FFT points in accordance with one embodiment of the present invention.
Figure 6B:
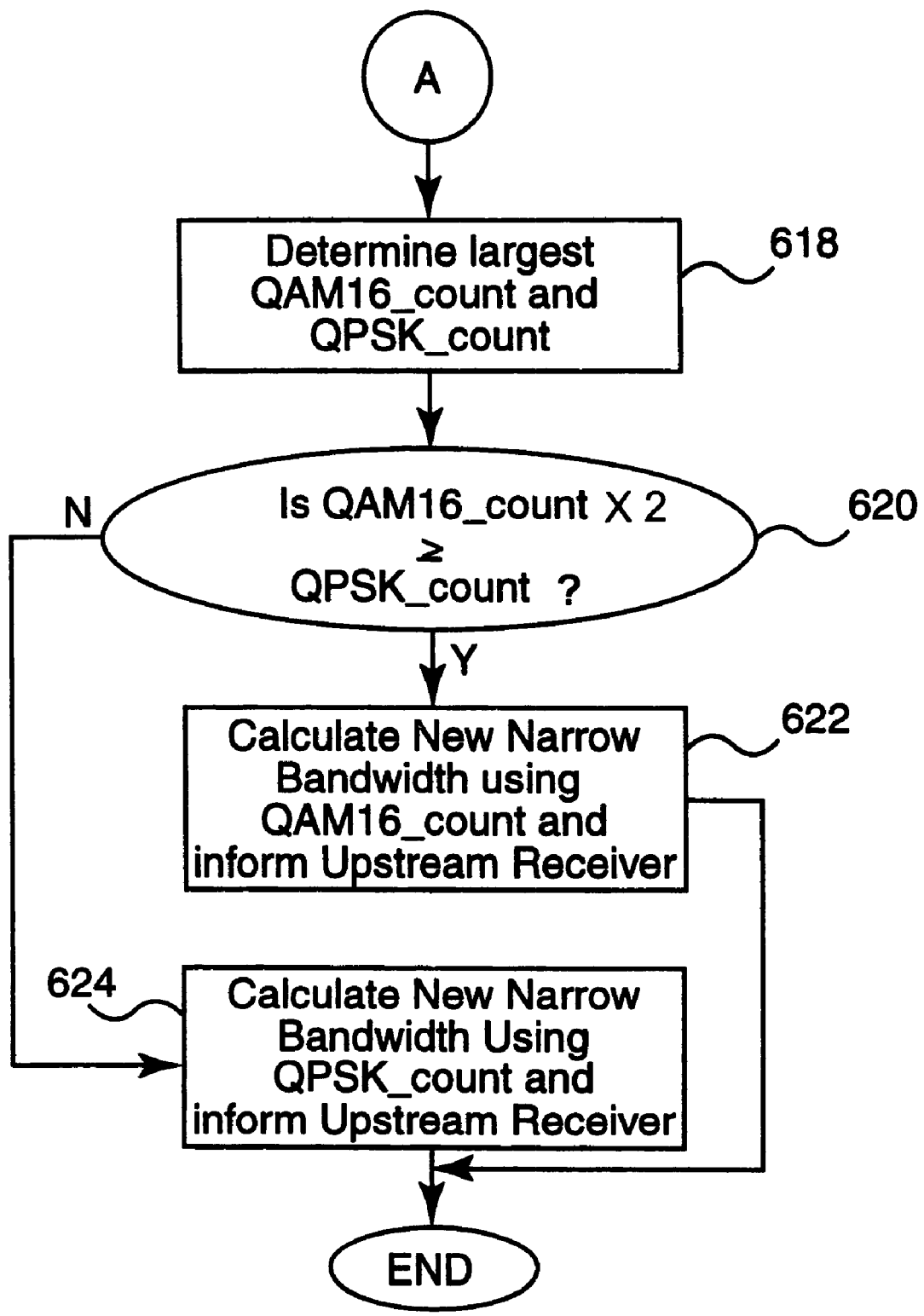

FIG. 6 is a flow diagram describing in greater detail steps 510 and 512 of FIG. 5 in which a new bandwidth is determined based on the number of contiguous clean FFT points in accordance with one embodiment of the present invention. At step 508 of FIG. 5, noise level data for each FFT point is stored in FPGA memory. Once this is complete, the narrow bandwidth detector and CPU can begin the process of identifying a usable narrow bandwidth. This process begins at a step 602 in which the CPU reads noise level data for an FFT point from the FPGA memory via the FPGA's CPU interface. At a step 604 the CPU determines whether the noise level for the particular FFT point is greater than a QAM16 noise threshold, typically set at 23 dB CNR in the described embodiment. If the noise level of the particular FFT point is less than the QAM16 noise threshold, control goes to a step 606. In the described embodiment, the CPU maintains two counters: a QAM16_count and a QPSK_count. In other preferred embodiments, more or few counters or registers can be maintained depending on the number of modulation schemes that can be used in the system. At step 606, the CPU increments both counters by one. The QPSK_count is also incremented because the QPSK noise threshold is always higher than that of QAM16. This is illustrated in greater detail in FIG. 7. Thus, if the noise level of the FFT point is less than the QAM16 threshold, it will necessarily be less than the QPSK threshold, which in the described embodiment is set in range of 23 dB CNR.

If at step 604 the noise level of the FFT bin is greater than the QAM16 noise threshold, the QAM16_count value is saved in temporary storage by the CPU and is then reset back to zero at a step 608. The value is saved because once the noise level of all the FFT bins have been examined, the CPU will perform final comparisons (described below) using the highest QAM16_count value. The counter is reset to zero because the narrow bandwidth detector and the CPU need to determine the largest set of contiguous or adjacent FFT bins below the noise thresholds. Thus, if there is an FFT bin that exceeds the QAM16 noise level threshold, the previous FFT bins that were below the noise threshold will no longer be contiguous with any subsequent FFT bins meeting the same criteria.

Similar to step 604, at a step 610 the CPU determines whether the noise level of the FFT bin is greater than the QPSK noise threshold, set at 15 dB CNR in the described embodiment. If the noise level is less than the threshold, the QPSK_count only is incremented by one as shown in a step 612. Only the QPSK_count is incremented at this point since it has already been determined at this stage that the QAM16 noise threshold has been exceeded for the FFT bin being examined. If the noise level of the FFT bin is higher than the threshold, control goes to a step 614 where the QPSK_count value is saved and then reset to zero for the same reasons as discussed in step Control from steps 606, 612, and 614 goes to a step 616 where the CPU checks whether there are any remaining FFT bins in the frequency channel. If there are, control returns to step 602 and noise level data for the next FFT bin is read from the FPGA memory and the process from steps 604 to step 616 is repeated. If there are no more FFT bins, control goes to a step 618 where the CPU determines the largest QAM16_count and the largest QPSK_count. At a step 620 the CPU determines whether twice the largest QAM_count is greater than or equal to the largest QPSK_count. This is done because the data or symbol rate of QAM16 is twice that of QPSK. The drawback with QAM16 is that it has a lower threshold for noise; that is, it needs a cleaner signal than QPSK does to transmit reliably. If twice the number of clean, contiguous bins for QAM16 is greater than the number of clean, contiguous bins for QPSK, the narrow bandwidth detector and CPU will inform the CMTS to use QAM16. The CPU will inform the CMTS of the necessary bandwidth data at which point control goes to a step 622. Step 620 is illustrated in greater detail in FIG. 7 below.

At step 622, the CPU calculates the new narrow bandwidth using the number of bins indicated by the QAM16_count and the width of each bin or FFT point (typically 50 KHz or less). This information is communicated to the CMTS, and specifically the upstream receiver which adjusts its symbol rate to reflect the new narrow bandwidth. Similarly, if at step 620 it is determined that the QPSK_count is greater than twice the QAM16_count, control goes to a step 624. At step 624, the new bandwidth is calculated from the number of FFT bins indicated in the QPSK_count and the width of each bin. This information is then transmitted to the CMTS and the upstream receiver adjusts its symbol rate to match the new bandwidth. In both steps 622 and 624, the CMTS informs the group of cable modems to use the new bandwidth within the frequency channel it is currently using. In other preferred embodiments, the process described in FIG. 6 can be used on another frequency channel to determine the cleanest bandwidth within that frequency channel before transitioning to that channel or for any other purpose where noise data of the frequency channel may be needed. After steps 622 and 624, the process is complete.

Figure 7:
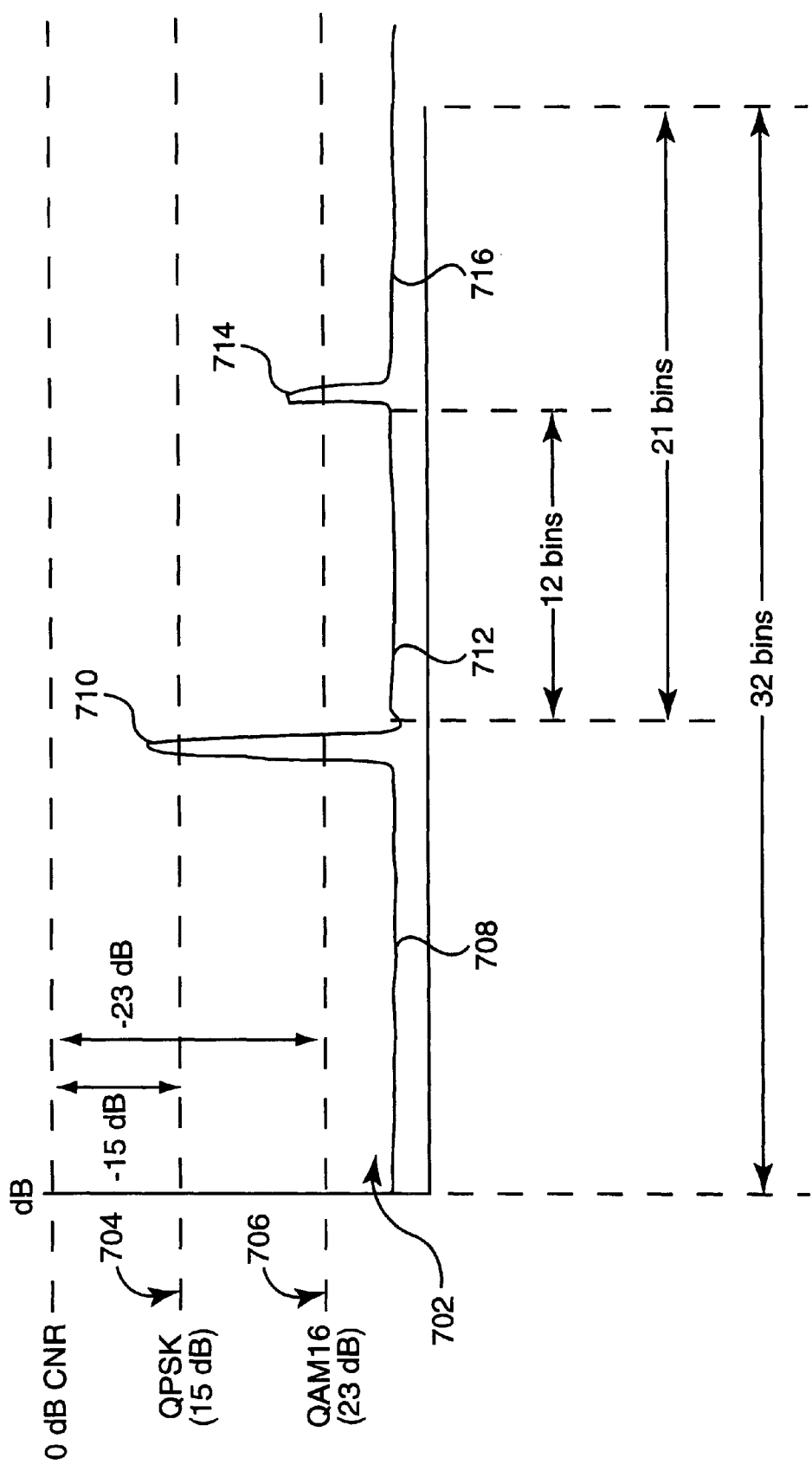
FIG. 7 is a graph plotting time and power level and depicting a sample signal on a frequency channel of interest showing noise thresholds for QPSK and QAM16 in accordance with one embodiment of the present invention.

FIG. 7 is a graph plotting time and power level and depicting a sample signal on a frequency channel of interest showing noise thresholds for QPSK and QAM16 in accordance with one embodiment of the present invention. A signal 702 is shown plotted against time and noise level. A QPSK noise threshold 704 is set at 23 dB but can be set based on known information theory. For example, for a bit error rate with error correction for $10^8$ BER, QPSK requires a carrier to noise ratio greater than 15 dB carrier to noise ratio and QAM16 needs a CNR greater than 23 dB CNR. A QAM16 noise threshold 706 is also shown below threshold 704. The data rate for QAM16 is twice that of QPSK but the noise threshold for QAM16 is lower (although not half) than that of QPSK as shown in FIG. 7. In the described embodiment, the noise thresholds are power levels above which the signal will not transmit data reliably and should not be used. QPSK has a higher threshold for noise; that is, a signal modulated in QPSK can transmit data more reliably on a noisy frequency channel than a signal modulated in QAM16.

To illustrate the process, the frequency channel shown in FIG. 7 is shown to be originally 3.2 MHz wide. The FFT performed on the signal carried on the frequency channel has 32 (i.e., $2^5$) 100 KHz FFT points or bins. Signal 702 is initially clean as shown at a signal portion 708 and comes in below thresholds 704 and 706. A sharp influx of noise on the channel causes the signal to spike up above both thresholds 704 and 706 as shown at signal portion 710. The signal then returns to its original power level indicating a clean channel at a signal portion 712. The frequency channel then experiences another influx of noise shown as a signal portion 714 not as powerful as the last causing the noise level of the frequency channel to rise above QAM16 noise threshold 706 but remains below QPSK noise threshold 704. The signal then returns to its original power level as shown in a signal portion 716.

As described in FIG. 6, the narrower bandwidth is determined from comparing the number of contiguous bins under QPSK noise threshold 706 and the number of contiguous bins under QAM16 noise threshold 704. The highest number of contiguous bins for QAM16 is 12 bins as shown at signal portion 712. The highest number of contiguous bins for QPSK is 21 bins shown at signal portions 712, 714, and 716. These three signal portions are contiguous and all fall under QPSK noise threshold 704. The CPU takes this information and determines the new narrow clean bandwidth. In this example, it doubles the number of QAM16 bins (24) and finds it greater than the number of QPSK bins (21). Thus, it informs the CMTS, specifically the MAC unit, to use a 1.2 MHz (12 bins at 100 KHz per bin) wide bandwidth at QAM16 modulation for upstream transmission.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, the narrow bandwidth detector can be located outside the headend and use a processor other than the one in the CMTS. In another example, different or additional modulation schemes can be considered when determining the optimal usable narrow bandwidth. In yet another example, the process of identifying a usable bandwidth can be performed on another frequency channel and not necessarily on the current frequency channel. This alternative frequency channel can be isolated by a filter, such as the digital receiver or any other appropriate filter, such as an FIR filter. Accordingly, the present embodiments are to be considered as illustrative and not restrictive, and the invention is not to be limited to the details given herein, but may be modified within the scope and equivalents of the appended claims.

What is claimed is:

1. A method of utilizing a frequency channel for transmitting data upstream in a cable plant from one or more cable modems to a cable modem termination system, the method comprising:
   receiving data from one or more cable modems at a cable modem termination system on a frequency channel of interest which is designated for upstream transmissions in the cable plant;
   analyzing the frequency channel of interest thereby creating a plurality of analysis points at different frequencies within the frequency channel of interest;
   identifying a clean bandwidth for transmitting data within the frequency channel of interest wherein the clean bandwidth is derived from a set of analysis points from the plurality of analysis points within the frequency channel; and
   instructing the one or more cable modems in the cable plant to constrain their data transmissions to the clean bandwidth within the frequency channel of interest.

2. A method as recited in claim 1 wherein receiving data at a cable modem termination system on a frequency channel of interest further comprises narrowing a broader frequency channel to derive the frequency channel of interest.

3. A method as recited in claim 2 further comprising determining that the broader frequency channel is unreliable for accurate data transmission.

4. A method as recited in claim 3 further comprising examining a bit error rate associated with the data being transmitted on the broader frequency channel.

5. A method as recited in claim 2 further comprising receiving the broader frequency channel at an upstream receiver located in the cable modem termination system.

6. A method as recited in claim 1 wherein receiving data at a cable modem termination system on a frequency channel of interest further comprises:
   digitizing the data; and
   routing the data on the frequency channel of interest to a narrow bandwidth detector.

7. A method as recited in claim 1 wherein analyzing the frequency channel of interest thereby creating a plurality of analysis points within the frequency channel of interest further comprises configuring an FPGA to perform an FFT.

8. A method as recited in claim 1 wherein identifying a clean bandwidth for transmitting data within the frequency channel of interest further comprises:
   comparing a noise level of an analysis point to a predetermined noise level; and
   incrementing a counter if the noise level of the analysis point is below the predetermined noise level.

9. A method as recited in claim 8 further comprising saving a value corresponding to the counter and resetting the counter if the noise level of the analysis point is above the predetermined noise level thereby storing one or more values corresponding to the counter.

10. A method as recited in claim 9 further comprising determining the largest value from the one or more values corresponding to the counter.

11. A method as recited in claim 10 further comprising deriving the clean bandwidth from the largest value of the one or more values corresponding to the counter.

12. A method as recited in claim 11 wherein deriving the clean bandwidth further comprises taking the product of the largest value of the one or more values corresponding to the counter and the width of an analysis point.

13. A method as recited in claim 1 wherein instructing one or more cable modems in the cable plant to use the clean bandwidth to transmit data further comprises adjusting a symbol rate of an upstream receiver to reflect the clean bandwidth.

14. A method as recited in claim 1 wherein the set of analysis points includes contiguous analysis points such that each contiguous analysis point has a noise level that meets a predetermined criteria.

15. A method as recited in claim 1 wherein the analysis performed is a Fast Fourier Transform and an analysis point is an FFT point.

16. A method of identifying a usable bandwidth in a noisy frequency channel capable of transmitting data using one of a first modulation scheme and a second modulation scheme, the method comprising:

(a) performing an FFT on the noisy frequency channel thereby creating a plurality of FFT points and deriving a plurality of noise level measurements, each one of the noise level measurements corresponding to an FFT point from the plurality of FFT points;

(b) comparing a noise level measurement from the plurality of noise level measurements to a first noise threshold associated with a first modulation scheme and incrementing a first counter associated with the first modulation scheme and a second counter associated with a second modulation scheme if the noise level measurement is less than the first noise threshold;

(c) comparing the noise level measurement to the second noise threshold and incrementing the second counter if the noise level measurement is less than the second noise threshold;

(d) repeating steps (b) and (c) until each noise level measurement from the plurality of noise level measurements has been compared to the first noise threshold and to the second noise threshold; and (e) determining whether to use the first modulation scheme or the second modulation scheme from comparing the first counter with the second counter.

17. A method as recited in claim 16 wherein the FFT is a 32-point FFT.

18. A method as recited in claim 16 wherein comparing a noise level measurement to a first noise threshold further comprises:

saving the first counter; and resetting the first counter to an initial value if the noise level measurement is greater than the first noise threshold.

19. A method as recited in claim 16 wherein comparing the noise level measurement to the second noise threshold further comprises:

saving the second counter; and resetting the second counter to an initial value if the noise level measurement is greater than the second noise threshold.

20. A method as recited in claim 16 wherein the first noise threshold is based on the QPSK modulation scheme and the second noise threshold is based on the QAM16 modulation scheme.

21. A method as recited in claim 16 wherein determining whether to use the first modulation scheme or the second modulation scheme from comparing the first counter with the second counter further comprises:

identifying the largest first counter and the largest second counter; and comparing a multiple of the largest first counter to the largest second counter.

22. A method as recited in claim 21 wherein the first counter is associated with the QPSK modulation scheme and the second counter is associated with the QAM16 modulation scheme and the multiple is two.

23. A method as recited in claim 22 wherein determining whether to use the first modulation scheme or the second modulation scheme from comparing the first counter with the second counter further comprises:

using the first modulation scheme if twice the largest first counter is greater than the largest second counter; and using the second modulation scheme if twice the largest first counter is less than the largest second counter.

24. A method as recited in claim 16 wherein deriving a usable bandwidth based on one of the first counter and the second counter and the width of an FFT point further comprises taking the product of the width of an FFT point and one of the first counter and the second counter.

25. A method as recited in claim 16 further comprising deriving a usable bandwidth based on one of the first counter and the second counter and the width of an FFT point.

26. A system for detecting a usable bandwidth within a frequency channel, the system comprising:

a processor; and a narrow bandwidth detector comprising:

a memory;

a processor interface; and a data processor configured to perform an FFT on a signal carried on the frequency channel which is designated for upstream transmissions in a cable plant, thereby creating a set of FFT points within the frequency channel wherein a subset of contiguous FFT points from the set of FFT points is identified as being a clean usable bandwidth for transmitting data, the data processor also being configured to instruct one or more cable modems using the frequency channel in the cable plant to constrain their data transmissions to the clean bandwidth within the frequency channel.

27. A system as recited in claim 26 further comprising a filter for narrowing a broader upstream channel to the frequency channel as input to the narrow bandwidth detector.

28. A system as recited in claim 27 wherein the filter is a receiver.

29. A system as recited in claim 26 further comprising an analog/digital converter for digitizing an analog signal.

30. A system as recited in claim 26 further comprising an upstream receiver having an adjustable input symbol rate that receives the signal carried on the frequency channel, thereby allowing the upstream receiver to receive data on varying size frequency channels.

31. A system as recited in claim 26 wherein the narrow bandwidth detector is located outside a headend of a cable plant.

32. A system as recited in claim 26 wherein the narrow bandwidth detector is located within a headend of a cable plant.

33. A system as recited in claim 26 wherein the narrow bandwidth detector is a digital signal processor programmed to perform an FFT on the signal carried on the frequency channel.

34. A system as recited in claim 26 wherein the processor is in communication with components of a cable modem termination system and the processor interface of the narrow bandwidth detector is an interface to the processor thereby enabling the processor to communicate with the narrow bandwidth detector and for the narrow bandwidth detector to communicate with components in the cable modem termination system.

35. A computer program product for utilizing a frequency channel for transmitting data upstream in a cable plant from one or more cable modems to a cable modem termination system, comprising:

a computer code that receives data from one or more cable modems at a cable modem termination system on a frequency channel of interest which is designated for upstream transmissions in the cable plant;

a computer code that performs an analysis on the frequency channel of interest thereby creating a plurality of analysis points at different frequencies within the frequency channel of interest;

a computer code that identifies a clean bandwidth for transmitting data within the frequency channel of interest wherein the clean bandwidth is derived from a set of analysis points from the plurality of analysis points within the frequency channel;

a computer code that instructs the one or more cable modems in the cable plant to constrain their data transmissions to the clean bandwidth within the frequency channel of interest; and a computer-readable medium that stores the computer codes.

36. The computer program product of claim 35, wherein the means for receiving data further comprises means for narrowing a broader frequency channel to derive the frequency channel of interest.

37. The computer program product of claim 35, wherein the means for receiving data further comprises:

means for digitizing the data; and means for routing the data on the frequency channel of interest to a narrow bandwidth detector.

38. The computer program product of claim 35, wherein the means for analyzing the frequency channel of interest further comprises means for configuring an FPGA to perform an FFT.

39. The computer program product of claim 35, wherein the means for identifying a clean bandwidth further comprises:

means for comparing a noise level of an analysis point to a predetermined noise level; and means for incrementing a counter if the noise level of the analysis point is below the predetermined noise level.

40. The computer program product of claim 35, wherein the means for instructing the one or more cable modems further comprises means for adjusting a symbol rate of an upstream receiver to reflect the clean bandwidth.

41. The computer program product of claim 35, wherein the set of analysis points includes contiguous analysis points such that each contiguous analysis point has a noise level that meets a predetermined criteria.

42. A computer program product for identifying a usable bandwidth in a noisy frequency channel capable of transmitting data using one of a first modulation scheme and a second modulation scheme, comprising:

a computer code that performs an FFT on the noisy frequency channel thereby creating a plurality of FFT points and deriving a plurality of noise level measurements, each one of the noise level measurements corresponding to an FFT point from the plurality of FFT points;

a computer code that compares a noise level measurement from the plurality of noise level measurements to a first noise threshold associated with a first modulation scheme and increments a first counter associated with the first modulation scheme and a second counter associated with a second modulation scheme if the noise level measurement is less than the first noise threshold;

a computer code that compares the noise level measurement to the second noise threshold and increments the second counter if the noise level measurement is less than the second noise threshold;

a computer code that repeats the computer code that compares a noise level measurement from the plurality of noise level measurements to a first noise threshold associated with a first modulation scheme and that repeats the computer code that compares the noise level measurement to the second noise threshold until each noise level measurement from the plurality of noise level measurements has been compared to the first noise threshold and to the second noise threshold;

a computer code that determines whether to use the first modulation scheme or the second modulation scheme by comparing the first counter with the second counter; and a computer-readable medium that stores the computer codes.

43. A computer readable medium on which is provided a computer code for detecting a usable bandwidth within a frequency channel, the computer code comprising:

instructions for performing an FFT on a signal carried on the frequency channel which is designated for upstream transmissions in a cable plant, thereby creating a set of FFT points within the frequency channel; and instructions for instructing one or more cable modems using the frequency channel in the cable plant to constrain their data transmissions to the clean bandwidth within the frequency channel;

wherein a subset of contiguous FFT points from the set of FFT points is identified as being a clean usable bandwidth for transmitting data.

44. A system for utilizing a frequency channel for transmitting data upstream in a cable plant from one or more cable modems to a cable modem termination system, the system comprising:

means for receiving data from one or more cable modems at a cable modem termination system on a frequency channel of interest which is designated for upstream transmissions in the cable plant;

means for analyzing the frequency channel of interest thereby creating a plurality of analysis points at different frequencies within the frequency channel of interest;

means for identifying a clean bandwidth for transmitting data within the frequency channel of interest wherein the clean bandwidth is derived from a set of analysis points from the plurality of analysis points within the frequency channel; and means for instructing the one or more cable modems in the cable plant to constrain their data transmissions to the clean bandwidth within the frequency channel of interest.

\* \* \* \* \*